(12) United States Patent
Caspall

(10) Patent No.: US 9,140,296 B2
(45) Date of Patent: Sep. 22, 2015

(54) ROLLER BEARING

(71) Applicant: Cooper Roller Bearings Co., Ltd., Norfolk (GB)

(72) Inventor: Martin Caspall, Norfolk (GB)

(73) Assignee: Cooper Roller Bearings Co., Ltd., Norfolk (GB)

(*) Notice: Subject to any disclaimer, the term of this patent is extended or adjusted under 35 U.S.C. 154(b) by 0 days.

(21) Appl. No.: 14/349,849

(22) PCT Filed: Oct. 2, 2012

(86) PCT No.: PCT/GB2012/052434
§ 371 (c)(1),
(2) Date: Apr. 4, 2014

(87) PCT Pub. No.: WO2013/050751
PCT Pub. Date: Apr. 11, 2013

(65) Prior Publication Data
US 2014/0254969 A1    Sep. 11, 2014

(30) Foreign Application Priority Data

Oct. 5, 2011  (GB) .................................. 1117134.5
Jul. 24, 2012 (GB) .................................. 1213145.4

(51) Int. Cl.
| | |
|---|---|
| F16C 23/08 | (2006.01) |
| F16C 33/58 | (2006.01) |
| F16C 19/18 | (2006.01) |
| F16C 19/38 | (2006.01) |
| F16C 33/60 | (2006.01) |
| F16C 35/063 | (2006.01) |

(52) U.S. Cl.
CPC ............. *F16C 19/181* (2013.01); *F16C 19/385* (2013.01); *F16C 23/086* (2013.01); *F16C 33/60* (2013.01); *F16C 33/605* (2013.01); *F16C 35/063* (2013.01)

(58) Field of Classification Search
CPC ...... F16C 23/08; F16C 23/082; F16C 23/084; F16C 23/086; F16C 23/088; F16C 33/504; F16C 33/60; F16C 33/605
USPC .......................... 384/558, 560, 570, 571, 577
See application file for complete search history.

(56) References Cited

U.S. PATENT DOCUMENTS

| | | | | |
|---|---|---|---|---|
| 3,166,363 | A | * | 1/1965 | Kay ............................... 384/570 |
| 3,304,140 | A | * | 2/1967 | Hornigold ...................... 384/537 |
| 4,475,777 | A | * | 10/1984 | Hofmann et al. ............. 384/572 |
| 5,743,659 | A | | 4/1998 | Stewart |
| 2008/0260317 | A1 | * | 10/2008 | Earthrowl et al. ............ 384/577 |

FOREIGN PATENT DOCUMENTS

| | | |
|---|---|---|
| GB | 2448712 | 10/2008 |
| JP | 2010-091047 | 4/2010 |
| WO | WO-2011/039526 | 4/2011 |

* cited by examiner

*Primary Examiner* — Phillip A Johnson
(74) *Attorney, Agent, or Firm* — Cesari and McKenna, LLP

(57) ABSTRACT

The present invention relates to a roller bearing (10) for supporting a rotatable component such as a shaft. We describe a double row roller bearing (10) for supporting a rotatable circular section component, said roller bearing (10) comprising an inner ring (11) including a pair of inner races (12, 13), an outer ring (17) including a pair of outer races (18, 19), two rows of rollers (22, 23) mounted between the inner and outer races, each row of which rollingly engages respective races in the inner and outer rings, clamping ring means (26) which surrounds and clamps said inner ring (11), at least said inner ring (11) and said clamping ring means (26) each comprising two substantially semicircular parts, the relevant semicircular parts being mounted together to provide a circular component for surrounding the rotatable component, and said clamping ring means (26) surrounds and clamps with said inner ring (11) at a position substantially midway between the axially opposite sides of the inner ring (11).

20 Claims, 4 Drawing Sheets

ROLLER BEARING

CROSS REFERENCE TO RELATED APPLICATIONS

This application is the National Stage of International Application No. PCT/GB2012/052434, filed on Oct. 2, 2012, which claims the benefit of Great Britain Application Nos. 1117134.5 and 1213145.4 filed on Oct. 5, 2011 and Jul. 24, 2012, respectively. The contents of each application are hereby incorporated by reference in its entirety.

FIELD OF THE INVENTION

The present invention relates to a roller bearing for supporting a rotatable component such as a shaft.

BACKGROUND OF THE INVENTION

Roller bearings of the double row type generally comprise an inner ring which includes a pair of outwardly facing raceways or bearing surfaces, an outer ring which includes a pair of inner facing raceways, and mounted between them, a pair of rows of rollers which engage respective raceways on the outer and inner rings, the rollers usually being mounted in a cage. In split roller bearings, the components (inner and outer rings, and cage are split in an axial plane (or substantially axial, they may be at a small angle as shown in the Figures) so as to be simply removable from the rotatable component without disengaging the bearing and rotatable component axially which is complex and time consuming. So that the inner ring will rotate with the rotatable component, the two semicircular parts of the inner ring are clamped around the rotatable component by means of two clamping rings which surround axially opposite ends of the inner ring.

In a cylindrical roller bearing having a single row of rollers, thrust loads are carried between the ends of the rollers and adjacent faces of roller guide lips. This is a sliding contact which is difficult to lubricate and thus the thrust load carrying capacity is relatively low compared to other bearing types, particularly at high shaft speeds.

Double row bearings are able to support higher thrust loads. Double row types of bearings include double row spherical bearings (in which there are provided two rows or rings of rollers, in which the inner race is spherically convex and the outer race is spherically concave), and double row taper bearings (in which each row of rollers have oppositely inclined taper rollers and corresponding shaped inner and outer races). In each of these arrangements, the axes of the rollers (and, indeed, the contact lines between the rollers and races) are not parallel to the bearing axis which better enables axial thrust to be absorbed (it is absorbed by the contact between the rollers and the raceways). The greater the angle between the roller axes and the bearing axis, the greater the ability to absorb axial thrust and so a configuration which allows an increase of that angle is technically advantageous.

In the usual configuration of clamping rings where the two semicircular parts of the inner ring are clamped around the rotatable component by means of two clamping rings which surround axially opposite sides of the inner ring, the clamping rings are acting on the two semicircular parts where they are thinnest. It would be useful to increase the thickness where the clamping rings act.

SUMMARY OF THE INVENTION

According to a first aspect, the present invention provides a double row roller bearing for supporting a rotatable circular section component, said roller bearing comprising an inner ring including a pair of inner races, an outer ring including a pair of outer races, two rows of rollers mounted between the inner and outer races, each row of which rollingly engages respective races in the inner and outer rings, clamping ring means which surrounds and clamps said inner ring, at least said inner ring and said clamping ring means each comprising two substantially semicircular parts, the relevant semicircular parts being mounted together to provide a circular component for surrounding the rotatable component, and said clamping ring means surrounds and clamps with said inner ring at a position substantially midway between the axially opposite sides of the inner ring.

Preferably said clamping ring means comprises a single ring. Preferably said inner ring includes a seating for mounting the clamping ring.

Said bearing is preferably a tapered bearing or a spherical bearing. In the case of a tapered bearing, the part of the inner ring in which said seating is provided is generally thicker than at the axially opposite sides of the inner ring.

Furthermore, where said bearing is a tapered bearing or a spherical bearing, the roller axes are not parallel to the axis of the bearing. In the case of a spherical bearing, as the distance between the rows of bearing increase, the angle between the axis of the bearing and the axes of the rollers increases allowing more axial thrust to be absorbed. The use of a clamping ring between the rows of rollers increases this distance and hence the angle between the axes of the rollers and the axis of the bearing.

With double row taper and some spherical bearings it is necessary to provide a guide surface to retain the tapered rollers and absorb the thrust which, because of their shape are urged to move axially as they roll. This guide surface is normally provided by a lip in the form of a side surface on the inner ring.

However, in a preferred arrangement of the invention we provide a guide surface on the clamping ring to engage the relevant end of the rollers to prevent undue axial movement of the rollers In a further preferred embodiment of the invention, we provide taper rollers in a double row taper roller bearing wherein the larger diameter ends of the two sets of rollers are adjacent one another.

In a further preferred embodiment, the inner ring comprises a generally cylindrical inner surface to engage with the outer circumferential surface of the shaft to clamp the inner ring to the shaft, said generally cylindrical inner surface having a larger diameter substantially midway between the axially opposite sides of the inner ring than remote therefrom before clamping the inner ring to the shaft.

In this way, by predetermining the changes in diameter from the midway point to the opposite sides of the inner ring, (i.e. change the profile of the cylindrical surface) one can reduce or eliminate or provide selected differences of pressure between the inner ring and shaft along the length of the shaft when the inner ring is clamped to the shaft.

BRIEF DESCRIPTION OF THE DRAWINGS

We will now describe various arrangements of double row roller bearings comprising preferred embodiments of the invention with reference to the accompanying drawings in which.

DESCRIPTION OF THE PREFERRED EMBODIMENTS OF THE INVENTION

Figure 1:
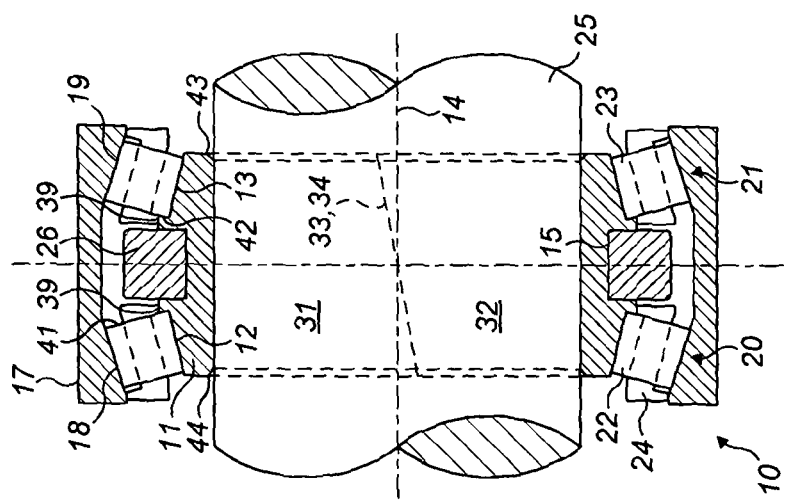
FIG. 1 is an axial section of a first taper roller bearing in accordance with a first preferred embodiment of the invention.

Referring to FIG. 1, there is shown a taper roller bearing 10 in accordance with the invention. An inner ring 11 includes two races or raceways 12, 13 which each include bearing surfaces 16. The two raceways 12, 13, are set at opposite angles to the axis 14 of the bearing 10 i.e. they have opposite tapers.

There is furthermore provided an outer ring 17 with two races or raceways 18, 19 at similar (but not identical) opposite angles to the axis 14 to the raceways 12, 13. Mounted between the inner 11 and outer 17 rings is a pair of circular cages 24, each cage 24 mounting a respective one of two side by side rows 20, 21 of rollers 22, 23, rollers 22 being mounted between raceways 12 and 18, and rollers 23 being mounted between raceways 13 and 19. The rollers are slightly conical. The apices of the cones of the raceways 12 and 18 and rollers 23 are common and lie on the bearing axis line, and the apices of the cones of the raceways 12 and 18 and rollers 23 are common and also lie on the bearing axis, the two apices lying on the axis on opposite sides of the bearing 10.

A seating 15 is provided substantially midway between the axially opposite sides 43, 44 of the inner ring 11, in which is seated a clamping ring 26 for clamping the inner ring to a rotatable component supported by the bearing 10. The rotatable component will usually be a shaft 25 and the inner ring 11 is clamped so as to rotate with the shaft 25.

Figure 5:
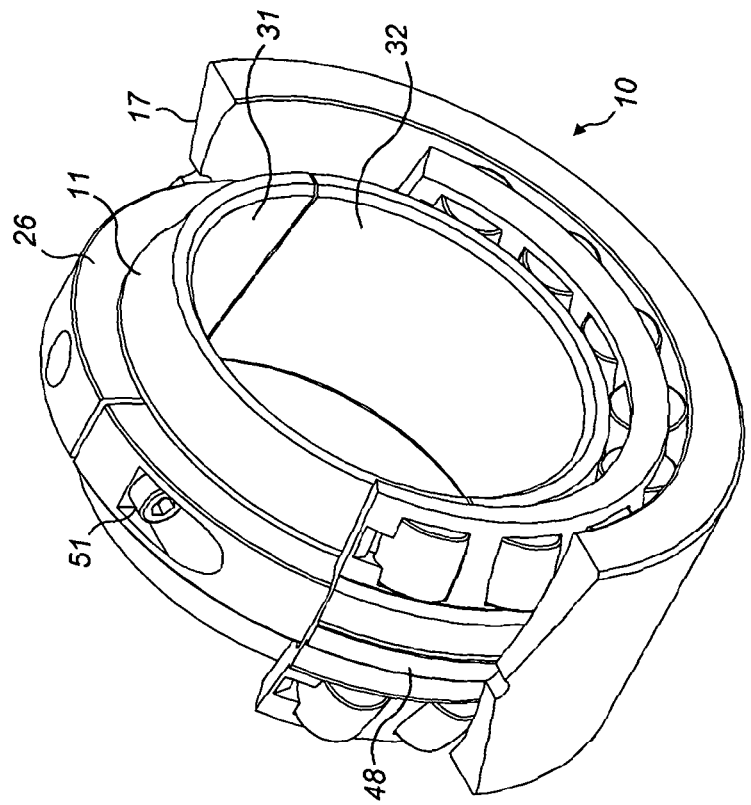
FIG. 5 is a cut away perspective view of the bearing of FIG. 4.
Figure 7:
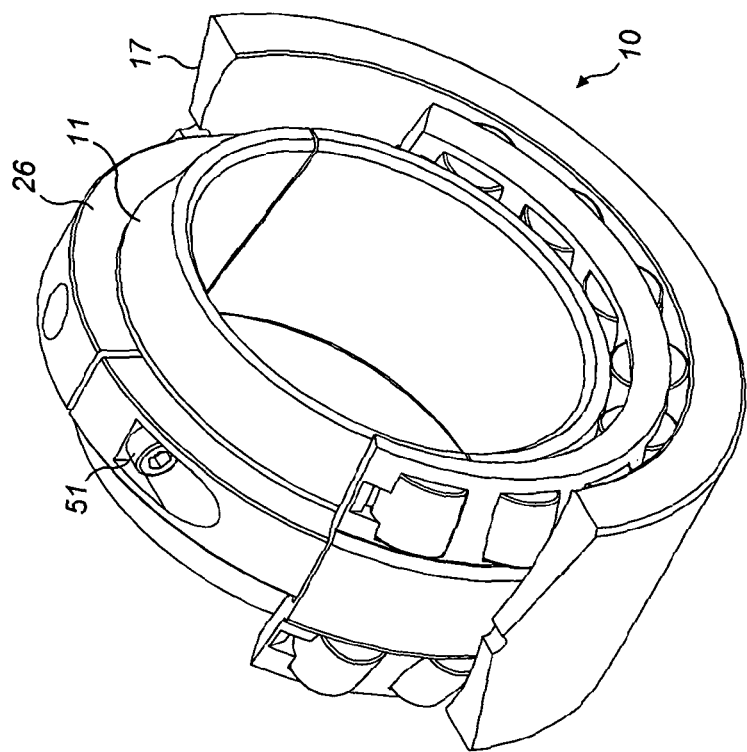
FIG. 7 is a cut away perspective view of the bearing of FIG. 6.

The clamping ring 26 is formed of two semicircular parts 37, 38 which are connected together by connector means such as screws or nuts and bolts 51, 52 passing tangentially through the two semicircular parts (see FIGS. 5 and 7).

The inner ring 11 is in the form of two semicircular ring portions 31, 32 there being provided a cut or split 33, 34 on diametrically opposite sides of the inner ring 11 and the line of the cut or split 33 is at an angle to the axis 14. In a similar way, the outer ring 17 is provided by two semicircular ring portions with diametrically opposed cuts similar to the cuts 33, 34. The angle of the angled cut 33, 34 to the axis of the bearing 10 is preferably between 6° and 30°, or 6° and 20°. The cuts or cut 33, 34 form end surfaces 33, 34 to the semicircular ring portions 31, 32. Whilst the inner ring and outer ring will normally be made as a unitary item and then cut into two semicircular parts, it is possible to manufacture the semicircular items separately. In the Figure the cuts 33, 34 are straight cuts at an angle to the axis 14 but they may be "V" shaped, or even a truncated "V" with a central portion under the clamping ring, 26 extending parallel to the axis 14 to reduce the wrap-around of the race for a given angle of cut.

By providing the inner 11 and outer 17 rings, cage 24 and clamping ring 26 in the form of two semicircular halves, the bearing assembly may be dismantled without axially disconnecting the shaft from the bearing 10.

It will be seen that in FIG. 1 the clamping ring 26 is of rectangular section. Axial thrust or movement of the rollers 22, 23 is resisted by the inner side wall 39 of the races 18, 19. It will also be noted that the larger diameter ends (illustrated at 41, 42) of each row of rollers 20, 21 are adjacent one another close to the midpoint between axially opposite sides 43, 44 of the inner ring 11.

In use, the disassembled clamping ring 26 and inner ring 11 are fitted together as follows.

The inner ring 11 is to be clamped around the shaft 25 so as to rotate with the shaft. The two semicircular inner ring portions 31, 32 are placed around the shaft 25, end to end together with the two semicircular portions of the clamping ring 26 which are engaged in the seating 15. The clamping ring semicircular portions 31, 32 are bolted together by bolts 51, 52, (shown in FIGS. 4 to 7),. When the inner ring portions are initially fitted to a shaft of the correct size, there will be a gap at both cuts 33, 34 of approximately 0.5 mm. The clamping force between the inner ring 11 and the shaft depends on the induced load in the clamping ring bolts 51 52 when tightened to the specified torque. This system can generate a level of interference between inner ring 11 and shaft that is comparable to a shrink fit of a solid bearing.

As set out above, a taper roller bearing is provided not only to provide a suitable radial load supporting bearing for the rotating shaft but also to absorb axial loads of the shaft with respect to the bearing. We have described a bearing with respect to the Figures which includes two oppositely pitched rows of rollers which can therefore absorb axial loads in opposite directions.

Because the forces on a taper roller tend to move it along its axis, across the raceway, away from the narrow end of the cone, a retaining lip (formed by the inner side wall 39) is required on one side of the races 12, 13 to maintain the rollers in position. In the design shown the lip is on the inner ring 11, but can be placed on the outer ring 17. As will be noted, the rollers have profiled (i.e. domed) end faces to facilitate the lubrication of the sliding contact.

Figure 2:
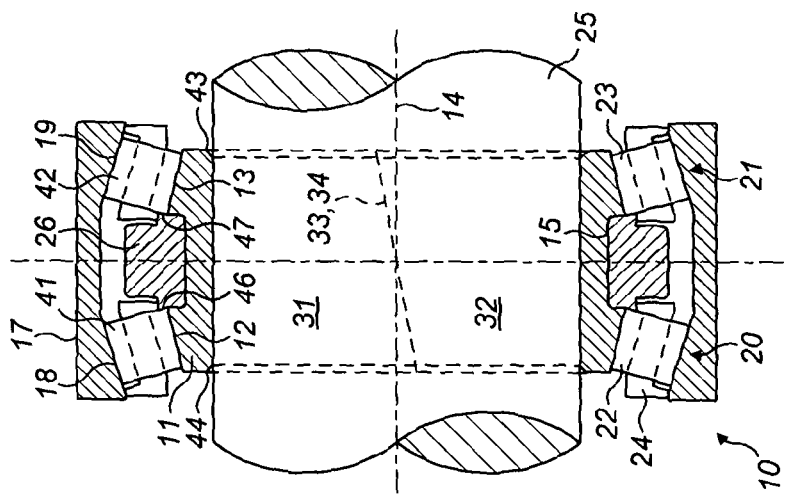
FIG. 2 is an axial section of a second taper roller bearing in accordance with a second preferred embodiment of the invention.

We now refer to FIG. 2 which shows a taper roller bearing similar to FIG. 1. However, in this case, it will be noted that the clamping ring 26 is not of rectangular cross-section but has lips 46, 47 which protrude from axially opposite faces. These lips 46, 47 are provided in place of the retaining feature of the inner side wall 39. In other words, axial thrust and movement of the rollers 22, 24 is resisted by the adjacent lips 46, 47.

Figure 3:
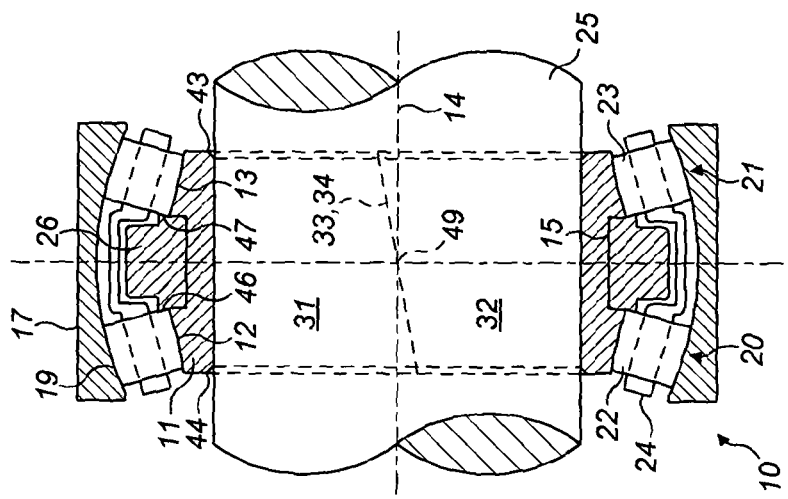
FIG. 3 is an axial section of a first spherical roller bearing in accordance with a third preferred embodiment of the invention.

FIG. 3 shows an arrangement similar to FIG. 2 except that in place of the taper roller bearing arrangement, there is provided a spherical bearing. Also the pair of cages 24 are replaced by a single cage 21 mounting both rows 20, 21 of rollers. The outer races 18, 19 are provided by a single spherical race 19, centred on a point 49 on the axis 14 midway between the opposite sides of the bearing.

The rollers 22, 23 are arranged generally similarly to FIG. 2, but their outer surfaces match the spherical outer race 19, that is, the line of contact of the rollers with the outer race 19 matches the surface of that race. The inner races 12, 13 are shaped so as to rollingly engage the outer surface of the rollers 22, 23. Such an arrangement is well-known and allows for rocking movement or alignment of the shaft 25 with respect to the bearing.

By spacing the two rows 20, 21 further apart by inserting a single clamping ring between them rather that two camping rings at opposite sides if the bearing, we effectively increase the angle between the axes of the rollers and the axis of the bearing to thereby increase the thrust absorbing ability of the bearing.

Once again, in this arrangement, the cross-section of the clamping ring 26 is similar to that in FIG. 2, incorporating lips 46, 47, which resist axial thrust or movement of the two roller rows 22, 23 towards one another.

Figure 4:
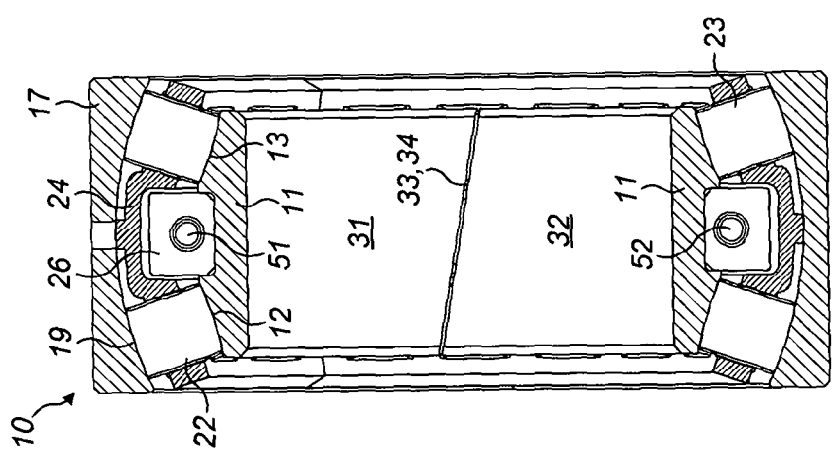
FIG. 4 is an axial section of a second spherical roller bearing in accordance with a fourth preferred embodiment of the invention.

FIG. 4 shows a view of an alternative spherical roller bearing similar to FIG. 3. In this particular view, the section cuts through the part of the clamping ring 26 through which the bolts 51, 52 pass. In this embodiment each roller is symmetrical about its mid-length, i.e. the two ends of the roller are of the same diameter. The shape of the inner race is adapted to suit. Unlike in the bearing in FIG. 3, the forces at the rolling contacts between the rollers and raceways have no substantial tendency to cause the rollers to move axially, so it is not necessary to provide guide lips for the rollers.

FIG. 5 which is a cut away perspective view of the bearing of FIG. 4, illustrate more clearly the form of cage 24 which mounts the two rows 22, 23 of rollers. As is clear from FIG. 4, in this arrangement, the cage 24 includes a circumferentially protruding lip 48. This lip 48 engages with the outer race 19 to maintain the cage 24 in correct alignment.

Figure 6:
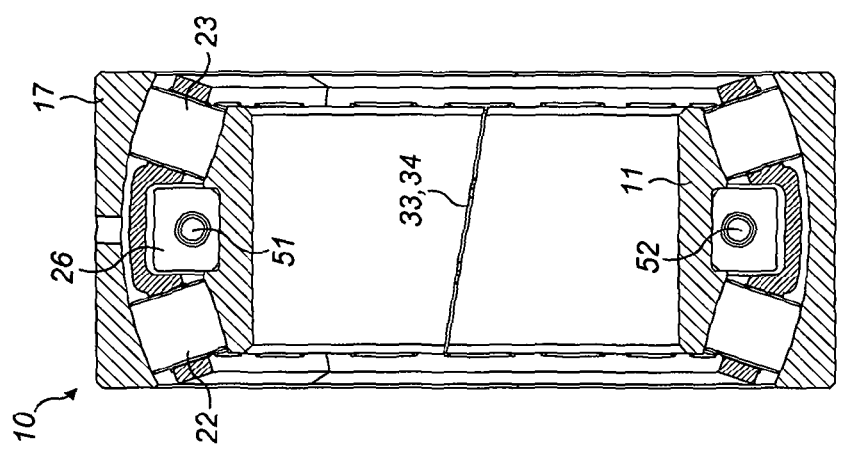
FIG. 6 is an axial section of a third spherical roller bearing in accordance with a fifth preferred embodiment of the invention.

FIGS. 6 and 7 show views similar to FIGS. 4 and 5 of a further embodiment of the invention which is substantially identical to that of FIGS. 4 and 5 except that the cage 24 does not include the circumferentially protruding lip 48 and rides on the two roller rows 22, 23.

Figure 8:
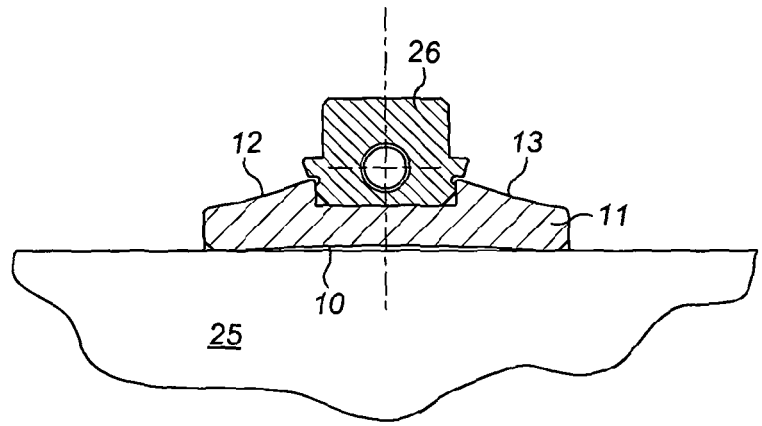
FIG. 8 is diagram of a second arrangement of roller bearing (a spherical roller bearing but the principal applies to taper bearings) showing a part axial section of shaft and inner ring and clamping rang before tightening and in particular showing in exaggerated form the shape of the generally cylindrical inner surface of the inner ring.
Figure 9:
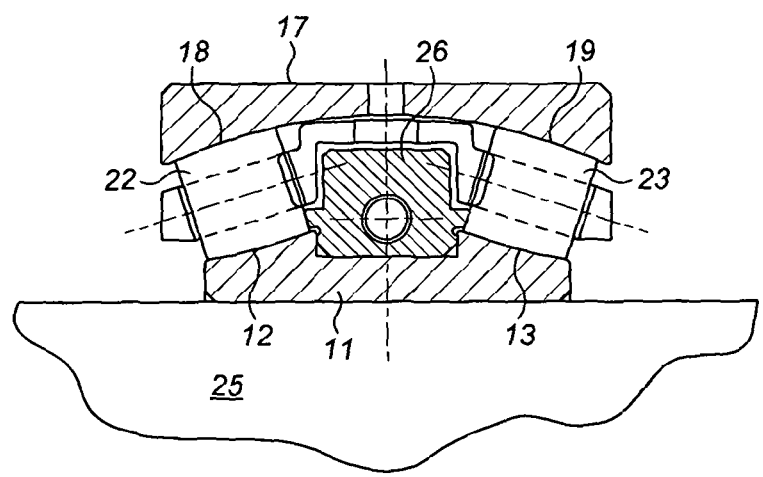
FIG. 9 is a diagram of the arrangement of FIG. 8 with the clamping ring tightened and remainder of the bearing assembled.

FIGS. 8 and 9 show part cross sections of a second arrangement of roller bearing a (spherical roller bearing but the principle applies to taper bearings). FIG. 8 shows a part axial section of the shaft 25 and inner ring 11 and clamping ring 26 before it is tightened and in particular shows in exaggerated form the shape of the generally cylindrical inner surface 10 of the inner ring 11. This shape is provided by changes in the diameter of the cylindrical inner surface 10 which has a larger diameter substantially midway between the axially opposite sides of the inner ring than remote therefrom. Thus the diameter decreases from the midpoint The bore of the inner ring 11 is concave, so that as the clamping ring is tightened a higher pressure is exerted on the shaft 25 by the portions of the inner ring 11 under the raceways 12 and 13 before the mid portion of the ring makes contact with the shaft 25.

The degree of concavity is precalculated so that the mid portion of the inner ring 11 is firmly seated to the shaft 25 once the clamping ring 26 is fully tightened.

FIG. 9 is a diagram of the arrangement of FIG. 8 with the clamping ring 26 tightened and rollers and outer ring of the bearing assembled.

One of the benefits of the arrangement of FIGS. 1 to 7 is that clamping the inner ring 11 at the thicker central portion provides better contact between the inner ring 11 and the shaft 25. Nevertheless, the pressure will still be greater and the ring will tend to grip to a greater extent under the clamping ring 26 and we wish to provide a more even pressure at all points along the axial length of contact between the inner ring 11 and the shaft 25. FIGS. 8 and 9 provide this.

From FIG. 8 it will be noted that the bore of the inner ring 11 is slightly concave—i.e. it will touch the shaft 25 at its ends, but will by held slightly proud of the shaft at the centre prior to tightening of the clamping ring 26. The bore of the inner ring 11 comprises a generally cylindrical inner surface 10 to engage with the outer circumferential surface of the shaft 25 to clamp the inner ring 11 to the shaft, prior to tightening of the clamping ring 26, the generally cylindrical inner surface 10 having a larger diameter substantially midway between the axially opposite sides of the inner ring 11 than remote therefrom. Tightening the clamping ring 26 causes the inner ring 11 to distort slightly so that the inner surface 10 becomes cylindriacal to match the outer surface of the shaft.

In this way, during design and manufacture, by choosing the variation in diameter from the midway point to the opposite sides of the inner ring 11, (i.e. change the profile of the cylindrical surface) one can reduce or eliminate differences of pressure or, indeed provide a desired pattern of prpessure between the inner ring 11 and shaft 25 along the length of the shaft when the inner ring 11 is clamped to the shaft.

In this way a more even pressure between the shaft 25 and inner ring 11 can be obtained across the width of the inner ring 11.

Detailed finite element modelling of the interface between the inner ring 11 and the shaft 25, does suggest that even a simple concave profile to the bore of the inner ring 11 provides the desired effect but other profiles may be used in various circumstances as appropriate.

The outer features of the inner ring 11 (most significantly the roller tracks)ay also distorted as the clamping ring 26 is tightened, so the geometry of these needs to be adjusted so that is correct once the inner ring is clamped and installed.

In summary, one of the advantages of the bearing with the inboard clamping ring 26 is that it clamps the inner ring at its thickest section and so urges the inner ring into close contact with the shaft 25. The arrangement of FIGS. 8 and 9 increase the contact pressure of between the inner ring and shaft underneath the roller tracks.

The invention is not restricted to the details to the foregoing examples.

The invention claimed is:

1. A double row roller bearing for supporting a rotatable circular section component, said roller bearing comprising:
   an inner ring including a pair of inner races,
   an outer ring including a pair of outer races,
   two rows of rollers mounted between the inner and outer races, each row of which rollingly engages respective races in the inner and outer rings, and
   a clamping ring which surrounds and clamps said inner ring,
   at least said inner ring and said clamping ring each comprising two substantially semicircular parts, the relevant semicircular parts being mounted together to provide a circular component for surrounding the rotatable component, wherein said clamping ring surrounds and clamps with said inner ring at a position substantially midway between the axially opposite sides of the inner ring.

2. The double row roller bearing as claimed in claim 1, in which said clamping ring comprises a single two part ring.

3. The double row roller bearing as claimed in claim 2, in which said inner ring includes a seating for mounting the clamping ring.

4. The double row roller bearing as claimed in claim 3, in which said bearing is a tapered bearing.

5. The double row roller bearing as claimed in claim 2, in which said bearing is a tapered bearing.

6. The double row roller bearing as claimed in claim 2, in which said bearing is a spherical bearing.

7. The double row roller bearing as claimed in claim 2, in which the roller axes are not parallel to the axis of the bearing.

8. The double row roller bearing as claimed in claim 1, in which said inner ring includes a seating for mounting the clamping ring.

9. The double row roller bearing as claimed in claim 8, in which said bearing is a tapered bearing.

10. The double row roller bearing as claimed in claim 8, in which said bearing is a spherical bearing.

11. The double row roller bearing as claimed in claim 8, in which the roller axes are not parallel to the axis of the bearing.

12. The double row roller bearing as claimed in claim 1, in which said bearing is a tapered bearing.

13. The double row roller bearing as claimed in claim 12, in which the part of the inner ring in which said seating is provided is thicker than at the axially opposite sides of the inner ring.

14. The double row roller bearing as claimed in claim 13, in which the larger diameter ends of the two sets of rollers are adjacent one another.

15. The double row roller bearing as claimed in claim 12, in which the larger diameter ends of the two sets of rollers are adjacent one another.

16. The double row roller bearing as claimed in claim 1, in which said bearing is a spherical bearing.

17. The double row roller bearing as claimed in claim 1, in which the roller axes are not parallel to the axis of the bearing.

18. The double row roller bearing as claimed in claim 1, in which a guide surface is provided on the clamping ring to engage the relevant end of the rollers to prevent undue axial movement of the rollers.

19. The double row roller bearing as claimed in claim 18, in which variation in diameter of the generally cylindrical inner surface from the midway point to the opposite sides of the inner ring is selected to reduce or eliminate differences of pressure between the inner ring and shaft along the length of the shaft when the inner ring is clamped to the shaft.

20. The double row roller bearing as claimed in claim 1, in which the inner ring comprises a generally cylindrical inner surface to engage with the outer circumferential surface of the shaft to clamp the inner ring to the shaft, said generally cylindrical inner surface having a larger diameter substantially midway between the axially opposite sides of the inner ring than remote therefrom before clamping the inner ring to the shaft.

* * * * *